United States Patent
Remes

(10) Patent No.: US 9,169,922 B1
(45) Date of Patent: Oct. 27, 2015

(54) SYSTEM AND METHOD FOR IMPROVING FUEL ECONOMY OF A VEHICLE POWERTRAIN

(71) Applicant: FORD GLOBAL TECHNOLOGIES, LLC, Dearborn, MI (US)

(72) Inventor: Enrique Remes, Huixquilucan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/301,616

(22) Filed: Jun. 11, 2014

(51) Int. Cl.
*G06F 17/00* (2006.01)
*F16H 61/02* (2006.01)
*B60W 50/14* (2012.01)
*F16H 61/00* (2006.01)

(52) U.S. Cl.
CPC .......... *F16H 61/0204* (2013.01); *B60W 50/14* (2013.01); *F16H 2061/0015* (2013.01); *F16H 2061/0075* (2013.01); *F16H 2306/40* (2013.01); *F16H 2710/04* (2013.01)

(58) Field of Classification Search
None
See application file for complete search history.

(56) References Cited

U.S. PATENT DOCUMENTS

| 5,166,881 | A  | * | 11/1992 | Akasu | 701/96 |
|---|---|---|---|---|---|
| 7,027,920 | B2 | * | 4/2006 | Madau | 701/301 |
| 7,835,840 | B2 | * | 11/2010 | Chiu et al. | 701/51 |
| 7,957,866 | B2 | * | 6/2011 | Oba et al. | 701/41 |
| 8,483,945 | B2 | * | 7/2013 | Herink | 701/302 |
| 2012/0226433 | A1 | | 9/2012 | Hasan et al. | |
| 2012/0268260 | A1 | * | 10/2012 | Miller et al. | 340/435 |

FOREIGN PATENT DOCUMENTS

| JP | 2009166729 A | 7/2009 |
|---|---|---|
| JP | 2012246828 A | 12/2012 |
| KR | 20120060105 A | 6/2012 |

* cited by examiner

*Primary Examiner* — Dirk Wright
(74) *Attorney, Agent, or Firm* — James Dottavio; Brooks Kushman P.C.

(57) ABSTRACT

A controller for a vehicle may include communication channels and control logic. The communication channels may be configured to receive distance data from a proximity sensor disposed on a vehicle and to send shift commands to a transmission. The control logic may be configured to respond to distance data indicating a second vehicle disposed at a distance closer than a threshold distance while the vehicle is moving at or below a threshold speed by sending a shift command to the transmission.

19 Claims, 4 Drawing Sheets

SYSTEM AND METHOD FOR IMPROVING FUEL ECONOMY OF A VEHICLE POWERTRAIN

TECHNICAL FIELD

The present application relates to control systems for vehicles during idle and stopped traffic conditions.

BACKGROUND

Heavily congested cities have a variety of traffic problems. During heavy traffic, pinch points may create a traffic jam. A traffic jam causes a vehicle to maintain a drive state while being stopped for a prolonged period of time. This increases fuel consumption and reduces overall fuel economy. Control systems for vehicles used to improve fuel economy and decrease fuel consumption typically involve stopping and starting a vehicle engine.

These systems cause the engine to shut down completely when the control system determines that no direct engine input is required. When the control system determines that torque is required to drive the vehicle, the control system will send a restart command to the engine. Once the engine restart command is received, the engine will restart and provide the necessary input torque to drive the vehicle. However, these control systems operate under a specified set of circumstances and are costly to install on vehicles.

SUMMARY

A method for controlling a vehicle transmission includes capturing data from a proximity sensor to estimate a distance between the vehicle and an object, monitoring a speed sensor to estimate a vehicle speed, and entering a traffic mode in response to the object being within a threshold distance of the vehicle and the vehicle speed being less than a threshold. The method further includes, while in the traffic mode with a shift selector in a drive position, shifting the transmission to a neutral state.

A vehicle includes a transmission, a proximity sensor disposed on the vehicle and configured to capture distance data, and at least one controller programmed to, while the vehicle is moving at a speed below a threshold speed, shift the transmission from a drive state to a neutral state. The controller is programmed to shift the transmission in response to the distance data from the proximity sensor identifying a second vehicle disposed at a distance closer than a threshold distance from the proximity sensor.

A controller for a vehicle includes communication channels and control logic. The communication channels are configured to receive distance data from a proximity sensor disposed on a vehicle and to send shift commands to a transmission. The control logic is configured to respond to distance data indicating a second vehicle disposed at a distance closer than a threshold distance while the vehicle is moving at or below a threshold speed by sending a shift command to the transmission.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
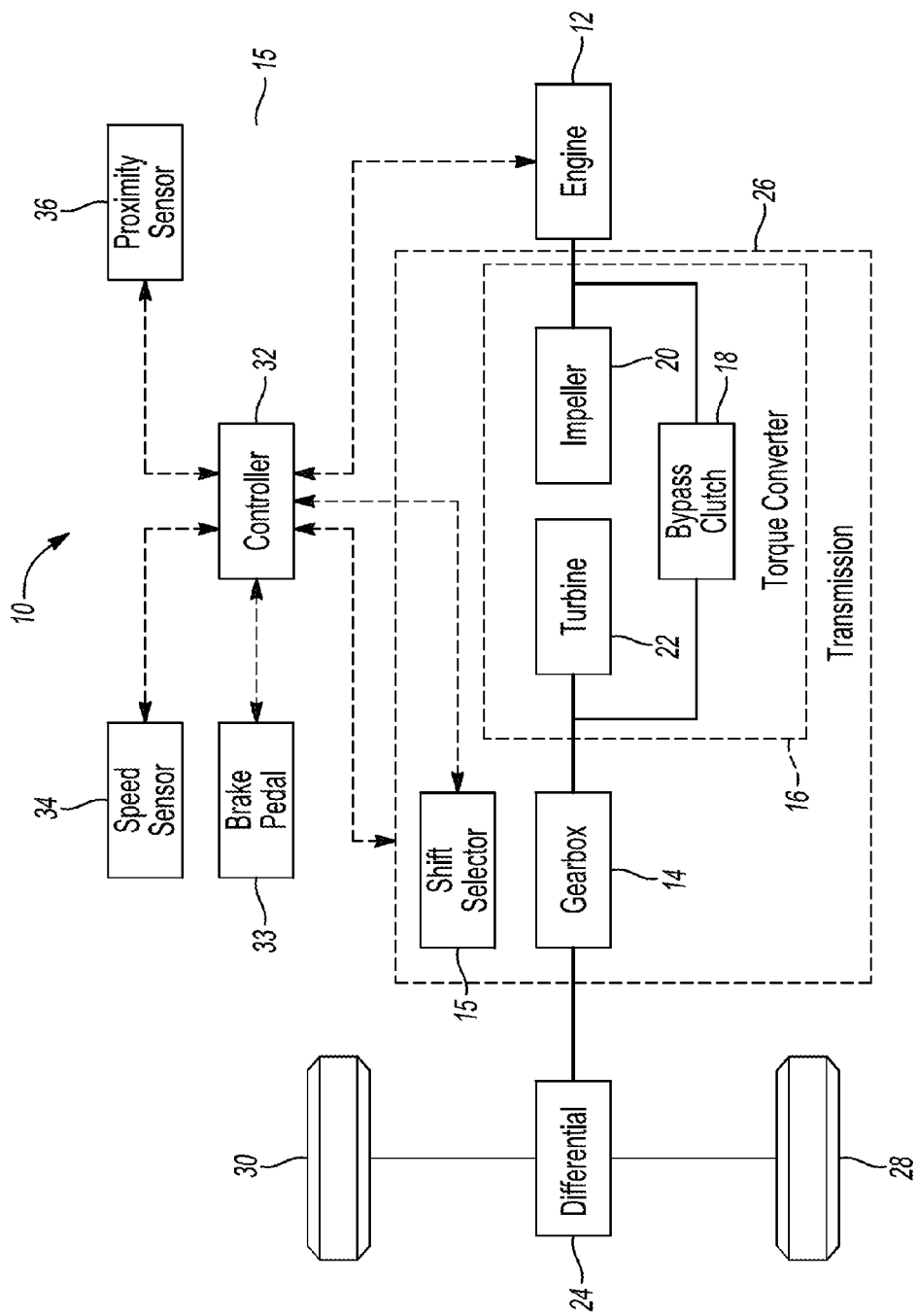
FIG. 1 is a schematic view of a vehicle powertrain.

A vehicle 10 with a traffic mode system is illustrated schematically in FIG. 1. Power to propel the vehicle 10 is provided by internal combustion engine 12. The power is transmitted to gearbox 14 by torque converter 16. Torque converter 16 provides two alternative power flow paths. When bypass clutch 18 is engaged, it transmits the power. When bypass clutch 18 is open, power is transferred hydro-dynamically through impeller 20 and turbine 22. The turbine 22 torque is a function of the speed of the impeller 20 and the speed of the turbine 22. Power is transferred from the impeller 20 to the turbine 22 only when the impeller 20 rotates faster than the turbine 22. When the ratio of impeller speed to turbine speed is high enough, the turbine torque is a multiple of the impeller torque. Gearbox 14 transmits power from torque converter 16 to differential 24 at various speed ratios. At low vehicle speeds, the gearbox 14 multiplies the turbine torque. At high vehicle speeds, the gearbox 14 may use an overdrive ratio that increases speed and decreases torque. Torque converter 16, gearbox 14, and associated controls collectively form transmission 26. Differential 24 further multiplies the torque by a fixed ratio and changes the axis of rotation by 90 degrees. Differential 24 transmits approximately equal torques to left and right wheels 28 and 30 while accommodating slight speed differences between the wheels 28, 30 as the vehicle 10 turns. Wheels 28 and 30 convert the torque into a tractive force against the road surface. The magnitude of the tractive force is directly proportional to the torque and inversely proportional to the radius of the wheel. Although FIG. 1 illustrated a longitudinal powertrain, the powertrain may also be mounted transversely, in which case the axis of rotation of the engine 12 and transmission 26 is parallel to, but offset from, the wheel axis.

Controller 32 sends signals to engine 12 to control the amount of power produced. These signals may impact, for example, the fuel flow, the throttle opening, and spark timing. Controller 32 also receives signals from engine 12 such as crankshaft speed. Controller 32 also sends signals to transmission 26 to control the state of engagement or release of bypass clutch 18 and various clutches and brakes within gearbox 14. Alternatively, transmission 26 may be a continuously variable transmission (CVT) in which gearbox 14 is a variator and signals from controller 32 control the variator ratio. Controller 32 receives signals from transmission 26 such as turbine speed and driveshaft speed. Controller 32 also receives signals from a speed sensor 34, proximity sensor 36, and driver activated controls such as the accelerator pedal, brake pedal 33, and shift selector 15. Controller 32 may be implemented as a single controller or as multiple communicating controllers.

When the vehicle is stationary or moving very slowly and gearbox 14 is in a drive state, turbine 22 will be stationary or moving very slowly. In order to keep engine 12 running smoothly, the engine speed must be maintained above an idle speed. Since impeller 20 rotates at the same speed as engine 12, the impeller speed is higher than the turbine speed. In this situation, impeller 20 applies torque to engine 12. Engine 12 consumes more fuel to produce this torque than would be required if the engine was running without load. If, on the other hand, gearbox 14 is in neutral, then the turbine 22 will simply increase in speed to the same speed as the impeller 20 such that the torque converter 16 does not apply torque to engine 12.

The controller 32 may use control logic to send signals directing the transmission 26 to shift from a drive state to a neutral state upon detection of a traffic jam. In order to minimize costs, the controller 32 may use sensors already disposed on the vehicle 10, such as speed sensor 34, proximity sensor 36, and driver activated controls such as the shift selector 15 and brake pedals 33. Once the data is received and processed by the controller 32, the controller 32 decides whether the vehicle 10 is in a traffic jam. If a traffic jam has been detected, the controller 32 enters a traffic mode. During the traffic mode, the controller 32 may direct the transmission 26 to shift from a drive state to a neutral state even though the driver has selected the D position with the shift selector 15. Likewise, while in the traffic mode the controller 32 may direct the transmission 26 to shift from a neutral state to a drive state if acceleration is commanded. This reduces engine torque reducing fuel consumption.

Figure 2:
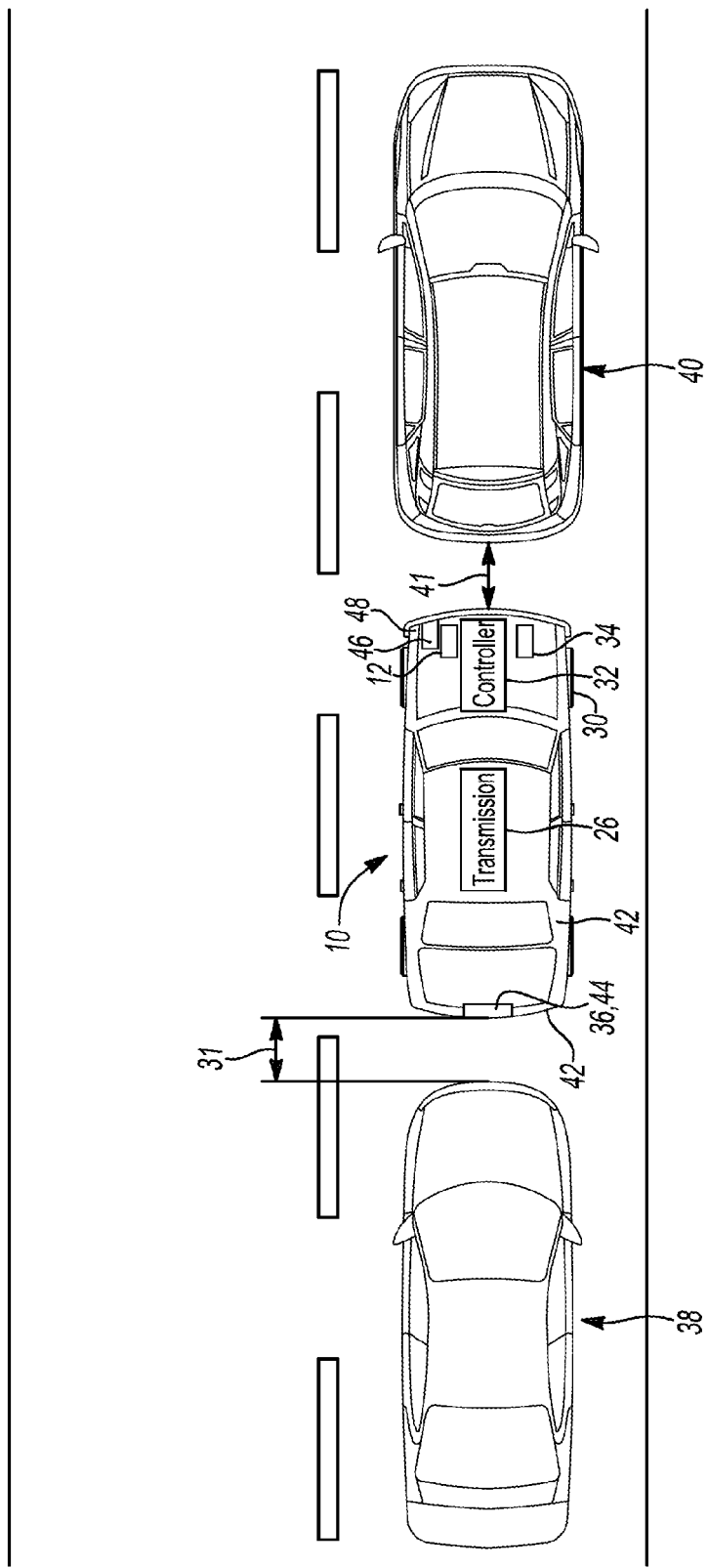
FIG. 2 is a top view of a vehicle in a traffic situation.

Referring to FIG. 2, a top view of a vehicle 10 in a traffic jam is shown. A first vehicle 10 is depicted as being surrounded. More specifically, the first vehicle 10 is shown in traffic having a steady-state, single-line jam. This may include a second vehicle 38 disposed directly behind the first vehicle 10, a third vehicle 40 directly in front of the first vehicle 10, or both a second vehicle 38 and third vehicle 40 surrounding the first vehicle 10. Controller 32 may use a proximity sensor 36 to determine whether the first vehicle 10 is surrounded.

In one embodiment, the proximity sensor 36 may be a camera 44. Some vehicles include rear facing cameras for the purpose of assisting the driver when moving in reverse. The camera 44, disposed on the rear area 42 of the first vehicle 10, captures an image of the second vehicle 38. The image data, captured by the camera 44, is processed by the controller 32. Specifically, the controller 32 measures a distance 31 between the rear area 42 of the vehicle 10 and the second vehicle 38. If the distance 31 is below a threshold distance, then the controller 32 may determine that the vehicle 10 is in a traffic jam.

Further, image data may be captured by using a second camera 46 disposed on a front area 48 of the vehicle 10. Again, the controller 32 will process the image data from the second camera 46 and measure a distance 41 between the front area 48 of the vehicle 10 and the third vehicle 40. If the distance 41 between the front area 48 of the first vehicle 10 and the third vehicle 40 is below the threshold distance, then the controller 32 may determine that the vehicle 10 is in a traffic jam. The controller 32, determining a traffic jam, may enter the traffic mode based on the image data.

The controller 32 may declare the traffic mode based on a speed signal. A further indication of a traffic jam, allowing the controller 32 to enter the traffic mode, may be the vehicle speed. If the vehicle 10 is moving at a speed below a threshold speed, then the controller 32 may determine the vehicle 10 is in a traffic jam. A speed sensor 34 may be disposed on the vehicle 10 wheels 28, 30. Vehicle speed may also be inferred based on driveshaft or turbine speed sensors if the relevant gear ratios are known. Monitoring the vehicle 10 speed, using the speed sensor 34, may further aid the controller 32 to determine an entrance into or exit from the traffic mode.

Traffic jams may either abruptly begin or end. If a traffic jam begins abruptly, then the distance 31 between the rear area 42 of the first vehicle 10 and the second vehicle 38 may rapidly decrease. Likewise, if a traffic jam abruptly ends, then the distance 31 between the rear area 42 of the vehicle 10 and a second vehicle 38 may rapidly increase. Therefore, the camera 44 may be configured to continuously capture images behind the rear area 42 of the vehicle 10 while the engine 12 is running. Further, the controller 32 may be configured to continuously process image data obtained from the camera 44. This allows the controller 32 to enter or exit the traffic mode depending on the sudden beginning or ending of a traffic jam.

For example, if the vehicle 10 suddenly enters a traffic jam, the camera 44 disposed on the rear area 42 of the vehicle 10 will capture an image of the distance between the rear area 42 of the vehicle 10 and the second vehicle 38. If the controller 32, through measuring the distance 31 between the rear area 42 of the vehicle 10 and the second vehicle 38, determines a traffic jam, then the controller 32 may enter the traffic mode. Likewise, if the vehicle 10 suddenly exits a traffic jam, the camera 44 may capture an image of an increased distance 31 between the rear area 42 of the vehicle 10 and a second vehicle 38, or may capture an image without the second vehicle 38. The controller 32 may process this data and may determine an exit of the traffic jam. The controller 32 may then exit the traffic mode.

While in the traffic mode, the controller 32 may command the transmission 26 to shift between neutral and drive states. Slight acceleration may be periodically required to compensate for slight increases of distance. Therefore, if the distance 31, 41 between the first vehicle 10 and the second vehicle 38 or third vehicle 40 increases above a threshold, then the transmission 26 may shift to a drive state until acceleration is no longer needed. Once the distance 31, 41 is reduced and acceleration is no longer needed, the transmission 26 may shift back into the neutral state. The traffic mode allows the transmission 26 to shift between drive and neutral states until the controller 32 determines an end of the traffic jam. Actively using the camera 44, through continuously monitoring the image data, allows the controller 32 to command the transmission 26 such that the torque converter 16 imposes fewer loads on engine 12. Maintaining the traffic mode may increase fuel economy and reduce fuel consumption by approximately 25%-30% by reducing friction losses from spinning the torque converter during an idle engagement.

The controller 32 may receive distance data from other proximity sensors 36 in conjunction with the camera 44 to further identify a traffic jam. For example, proximity sensors 36 located on the rear area 42 of the vehicle 10 may also send a signal, indicating that the vehicle 10 is surrounded, to the controller 32. Some vehicles already include fender mounted proximity sensors 36 to assist the driver when parking. Continuous monitoring of the proximity sensors 36 allows the controller 32 to assess whether the vehicle 10 is in a traffic jam. This allows controller 32 to define a traffic mode.

Figure 3:
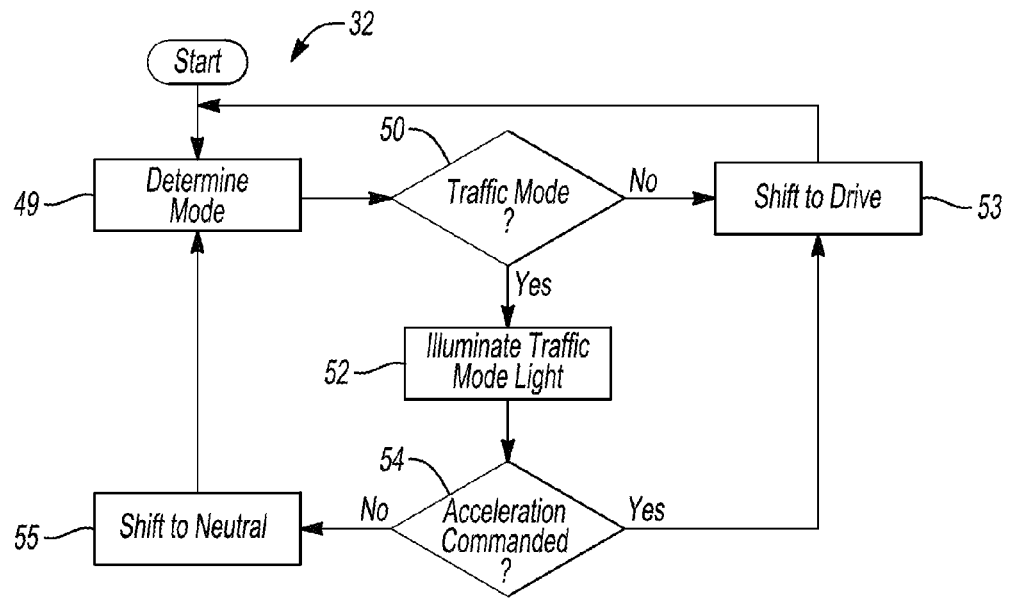
FIG. 3 is a flow chart describing the control logic of the present disclosure.

Referring to FIG. 3, a flow chart of control logic for the controller 32 is described. The control logic aids the controller 32 in selecting either neutral or drive state. At 49, the controller determines the current mode of the vehicle. At 50, the controller 32 determines whether the vehicle 10 should enter the traffic mode as described above. If the controller 32 determines the traffic mode is not needed, then the transmission may shift to the drive state, at 53.

If the controller 32 determines a traffic mode is needed, a traffic mode indicator light may be illuminated at 52. Once the controller 32 determines the presence of the traffic jam and activates the traffic mode at 50, the controller 32 may output a signal at 52 indicating to a driver that the vehicle is in the traffic mode. The signal may cause a light to illuminate at 52 within the vehicle. Further, the signal may cause a chime within the vehicle. This may alert the driver that the vehicle is operating within the traffic mode at 50 and the transmission may actively shift between neutral and drive states for as long as the vehicle is in the traffic mode at 50.

The controller 32 may also check if acceleration is commanded at 54. If acceleration is commanded at 54, then the controller 32 directs the transmission 26 to shift to a drive state at 53. If no acceleration is commanded at 54, then the controller 32 directs the transmission to shift to a neutral state at 55. After either shifting to a drive state at 53 or to a neutral state at 55, the controller 32 may continuously determine the driving mode, at 49, of the vehicle. This allows the controller 32 to continuously process data to declare a traffic mode at 50.

Figure 4:
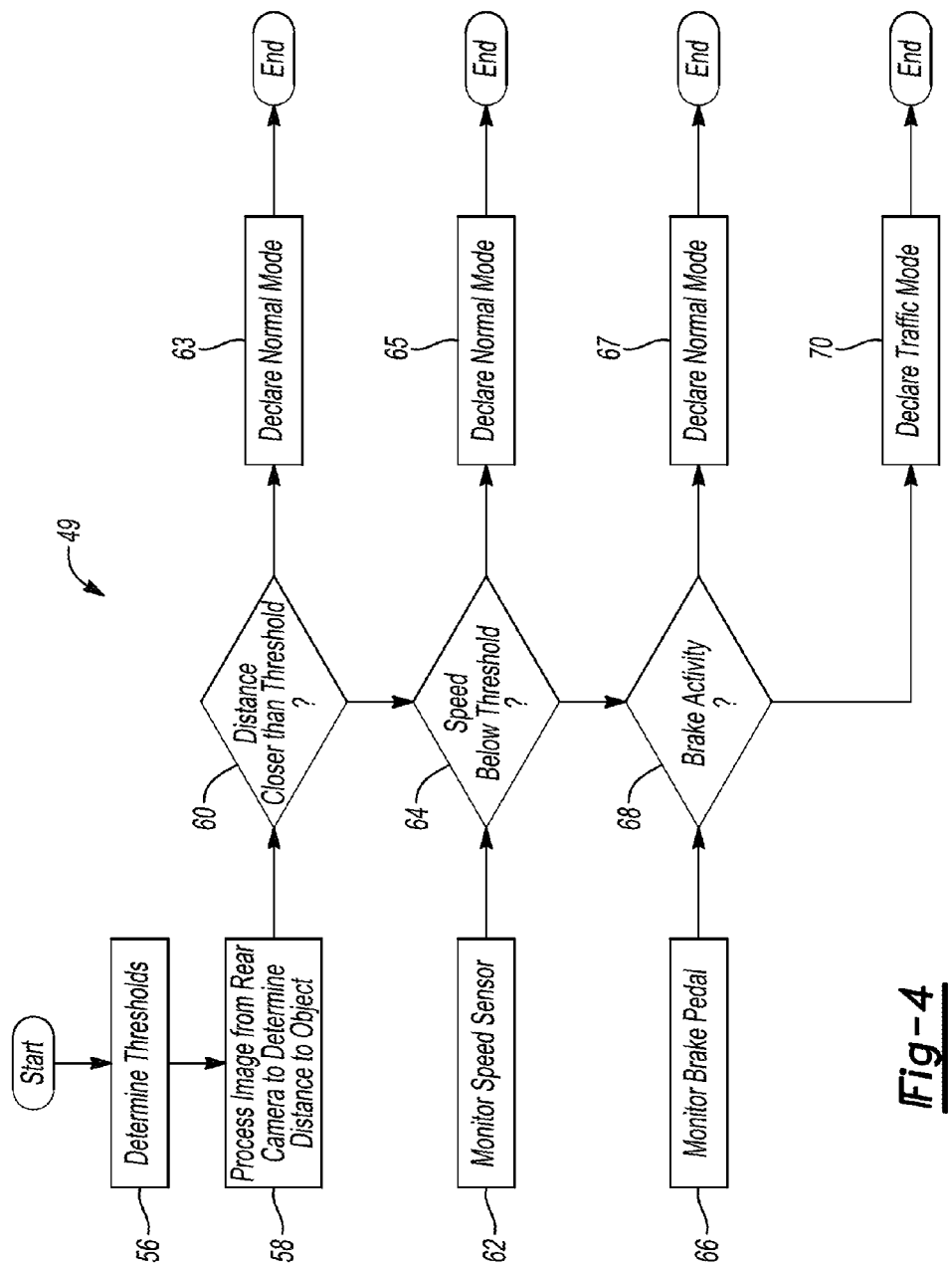
FIG. 4 is a flow chart depicting the traffic mode of the present disclosure.

FIG. 4 depicts a flow chart of how the controller determines a traffic mode at 49. The control logic allows the controller to continuously process data from the proximity sensors at 58 and the speed sensors at 62. The controller determines a threshold distance and a threshold speed at 56. At 58, the controller processes distance data from the proximity sensors, or more specifically image data from the camera as described above. At 60, the controller determines whether an object is closer than the threshold distance. If the distance is greater than the threshold, the controller declares normal mode driving at 63. If the distance is less than the threshold, the controller may monitor speed sensors at 62 and compare to a threshold speed at 64. If the vehicle speed is above the threshold speed at 64, the controller may declare normal driving mode at 65. If the vehicle speed is at or below the threshold speed at 64, then the controller may maintain the traffic mode control logic.

The threshold speed at 56 may further dictate whether the vehicle is in a traffic jam. The threshold speed at 56 may be determined and optimized according to the speed conditions commonly associated with a traffic jam. For example, some traffic jams may require slight increase in speed over a short distance. The threshold speed at 56 may be optimized to allow the controller to maintain the traffic mode control logic during slight increases of speed at 64. The threshold speed at 56 may be determined to be approximately 5 mph. The controller may monitor a speed sensor at 62. If the vehicle is moving at a speed below the threshold speed at 64 and the controller receives a speed signal at 62 from the speed sensor, then the controller may add the increase in speed from the speed signal at 62 and compare the increased speed to the threshold speed at 64.

The controller may also monitor a brake pedal at 66. Monitoring the brake pedal activity at 66 allows the controller to determine brake activity at 68. For example, if a driver depresses, releases, and depresses the brake pedal again within 5 seconds of releasing the brake pedal, then the controller may recognize brake activity at 68. This may indicate to the controller the presence of a traffic jam and declare the traffic mode at 70. If brake activity is not present at 68, then the controller may declare normal driving mode at 67. If the controller determines brake activity is present at 68, the controller may declare the traffic mode at 70.

The traffic mode may be declared upon the controller recognizing brake activity at 68, processing speed signals at 64, and measuring distance data at 60. While the process depicted in FIG. 4 and the accompanying description of FIG. 4 indicate a sequential ordering of the operations, at least some of the operations may occur in a different order, and some operations may be performed concurrently or not at all.

Figure 5:
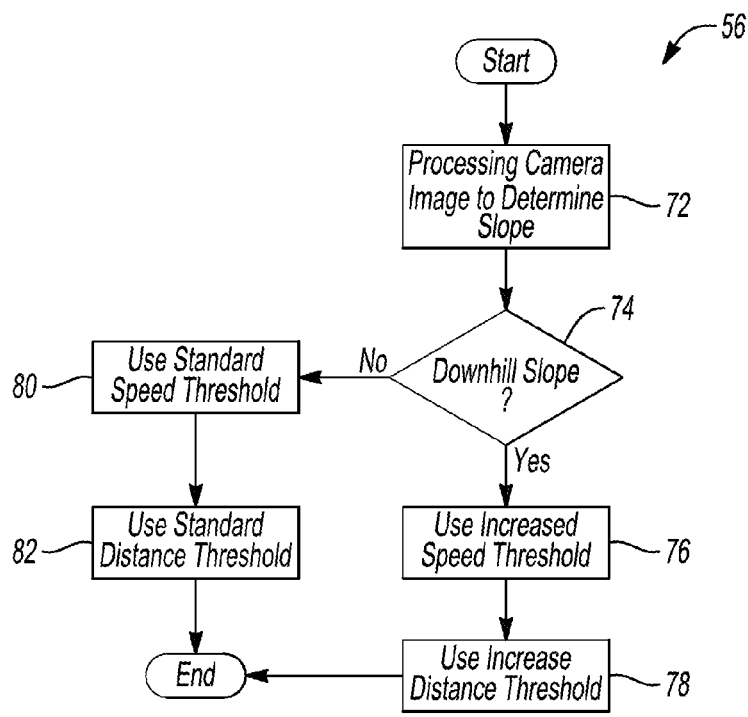
FIG. 5 is a flow chart depicting further control logic for the present disclosure.

Referring to FIG. 5, a flowchart depicting further control logic for the controller determining thresholds at 56 is shown. The controller may extend the traffic mode during certain circumstances. At 72, the image data processed through the camera by the controller 32 may indicate a downhill horizon. If the controller, at 74, determines a downhill horizon, the controller may use an increased speed threshold at 76 and increased distance threshold at 78. The increased thresholds may be calculated by the controller based on the downhill slope information captured by the camera at 72.

For example, the controller may calculate the slope of the horizon and add to the speed threshold at 76 to account for increased vehicle speed based on the downhill slope. The controller may maintain the traffic mode on a downhill horizon as long as acceleration is not demanded. Likewise, the controller may use the slope of the downhill horizon to increase the distance threshold at 78. On a downhill horizon, the distance between vehicles may be increased to account for the increased speed due to the slope of the horizon. The controller may use the increased speed at 76 and distance thresholds at 78 to declare the traffic mode as described above. If no downhill slope is detected at 74, then the standard speed and distant thresholds at 80, 82, are used to declare the traffic mode, as described above.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of controlling a vehicle transmission comprising:
   capturing data from a proximity sensor to estimate a distance between the vehicle and an object;
   monitoring a speed sensor to estimate a vehicle speed;
   entering a traffic mode in response to the object being within a threshold distance of the vehicle and the vehicle speed being less than a threshold speed; and while in the traffic mode with a shift selector in a drive position, shifting the transmission to a neutral state.

2. The method of claim 1, wherein shifting the transmission to a neutral state occurs in response to application of a brake pedal within 5 seconds after releasing the brake pedal.

3. The method of claim 1, wherein the proximity sensor is a camera.

4. The method of claim 1, further comprising while in the traffic mode, based on data from the proximity sensor, updating the estimate of the distance between the vehicle and the object.

5. The method of claim 4, further comprising exiting from the traffic mode in response to the object being farther than the threshold distance from the vehicle.

6. The method of claim 5, further comprising shifting the transmission to a drive state upon exiting the traffic mode.

7. The method of claim 1, further comprising indicating to a driver that the vehicle is operating in the traffic mode.

8. The method of claim 7, wherein operating in the traffic mode illuminates a light within the vehicle.

9. A vehicle comprising:
a transmission;
a proximity sensor disposed on the vehicle and configured to capture distance data; and
at least one controller programmed to, while the vehicle is moving at a speed below a threshold speed, shift the transmission from a drive state to a neutral state in response to the distance data from the proximity sensor identifying a second vehicle disposed at a distance closer than a threshold distance from the proximity sensor.

10. The vehicle of claim 9 wherein the proximity sensor is a camera.

11. The vehicle of claim 10 wherein the controller is further programmed to increase the threshold distance in response to image data from the camera indicating a downhill slope.

12. The vehicle of claim 10 wherein the controller is further programmed to increase the threshold speed in response to image data from the camera indicating a downhill slope.

13. The vehicle of claim 9 wherein the controller shifts the transmission to a neutral state in response to application of a brake pedal within 5 seconds after releasing the brake pedal.

14. A controller for a vehicle comprising:
communication channels configured to receive distance data from a proximity sensor disposed on a vehicle and to send shift commands to a transmission; and
control logic configured to respond to distance data indicating a second vehicle disposed at a distance closer than a threshold distance while the vehicle is moving at or below a threshold speed by sending a shift command to the transmission.

15. The controller of claim 14 wherein the shift command is from a drive state to a neutral state.

16. The controller of claim 14 wherein the control logic is further programmed to output a shift command from a neutral state to a drive state in response to the vehicle speed increasing above the threshold speed.

17. The controller of claim 14 wherein the control logic is further programmed to output a shift command from a neutral state to a drive state when the second vehicle is disposed at a distance greater than the threshold distance.

18. The controller of claim 14 wherein the control logic is further programmed to output a shift command to a neutral state in response to application of a brake pedal within 5 seconds after releasing the brake pedal.

19. The controller of claim 14 wherein the proximity sensor is a camera.

* * * * *